United States Patent [19]

Bailey

[11] 3,798,647
[45] Mar. 19, 1974

[54] HIGH FREQUENCY PASSIVE RADIO RANGE FINDER

[75] Inventor: Albert D. Bailey, Champaign, Ill.

[73] Assignee: The United States of America as represented by Secretary of the Navy, Washington, D.C.

[22] Filed: May 25, 1972

[21] Appl. No.: 256,961

[52] U.S. Cl.............................................. 343/112 D
[51] Int. Cl................................................. G01s 3/02
[58] Field of Search........ 343/112 R, 112 D, 100 R, 343/113 R

[56] References Cited
UNITED STATES PATENTS 3,577,146   5/1971   Freier ............................ 343/112 D
3,307,192   2/1967   Attwood ........................ 343/112 D
3,476,921   11/1969  Jones et al. .................... 343/112 D Primary Examiner—Maynard R. Wilbur
Assistant Examiner—T. M. Blum
Attorney, Agent, or Firm—R. S. Sciascia; R. J. Miller

[57] ABSTRACT

The application discloses an invention for determining the direction and distance of a remotely located radio source based on the principle that the distance to a station is inversely proportional to the root mean square value or peak value of the received continuous bearing signal as a function of time which has first been passed through a twenty minute averaging or smoothing window.

2 Claims, 3 Drawing Figures

HIGH FREQUENCY PASSIVE RADIO RANGE FINDER

For many years the radio direction finding community has been interested in passive radio direction location where the azimuthal direction of arrived data from two or more directions was known. Direction findings are combined to determine the most probable point of origin of the radio source.

It is well known that radio signals from a station will travel in a line of sight mode and those which encounter the ionosphere at some critical angle will be reflected back down to the earth and will be received at a remotely located station. Those signals that encounter the ionosphere at a higher angle will pass therethru. A passive listening station receiving a signal from a remotely located station may transmit a signal having a frequency close to that of the received signal and along the same angles of arrival and by measuring the backscatter from the ionosphere may determine the distance to the reflecting point and by timing the echo or echo signal estimate the range; this would be an active system.

In this application an observed phenomenon is used in conjunction with existing equipment to utilize a newly recognized principle for passive radio direction locating devices.

That principle is that either the root mean square of the received bearing signal from a remote source or the peak signal received from that source when averaged over a period ideally some 20 minutes long is inversely related to the range.

The invention provides several advantages over existing State of the Art passive radio direction finders. Among those is that this invention may be utilized with existing radio direction finder facilities and may be incorporated therein without modification of existing facilities. Further, it provides an additional statistical measure that has significance in estimating the range to the source of an unknown signal. This invention is simple to implement and construct with attendant low cost which would augment its availability for utilization.

Therefore, it is an objective of this invention to provide an improved radio direction finder.

It is yet a further objective of this invention to provide an improved radio range finder capable of being coupled to an existing radio frequency direction finder of the passive type including the addition of a very low pass filter; a root mean square or peak reading digital voltmeter coupled to the filter, means coupled to the voltmeter for determining the root mean square or peak deviation and means including a criteria test device whereby the most probable range to a radio transmitter may be estimated by comparing inversely root mean square or peak deviation with the range.

It is yet a further objective of this invention to provide an improved passive type high frequency radio direction finder whereby the low pass filter passes signals having 15 to 30 minute cycle or period.

It is yet a further objective of this invention to provide a passive type radio frequency range finder particularly adapted to Wullenweber or CDAA type of radio direction finder equipment for passively determining the range of a received signal.

Other objects, advantages and novel features of the invention will become apparent from the following detailed description of the invention when considered in conjunction with the accompanying drawings wherein.

Figure 1:
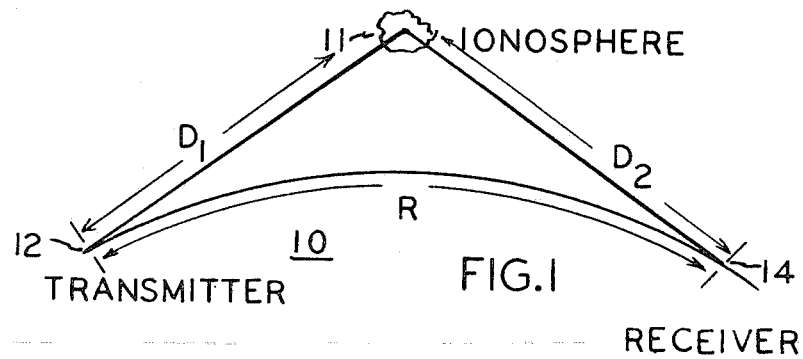
FIG. 1 shows the surface of the earth having transmitting and receiving stations located thereon.

It is well known that the earth's curvature 10 depicted in FIG. 1 is such that radio stations remotely located from each other receive signals only thru the "bounce" from the ionosphere 11. As shown, transmitter 12 projects a signal along path $D_1$ to the ionosphere 11.

Since the angle of incidence of the signal at the ionosphere is below the critical angle, the signal is reflected along path $D_2$ to a passive radio direction finder 14. The distance or range over the surface of the earth between the transmitter and receiver is designated as R which is the value to be determined. The ionosphere is not a small mirror like reflecting surface which gives precise figures, but rather is a fluctuating, changing region that produces difficulties in ranging. It has been observed that certain fluctuation and variations of the ionosphere layer tend to repeat themselves over some 20 minute intervals and that this is very repeatable.

Figure 2:
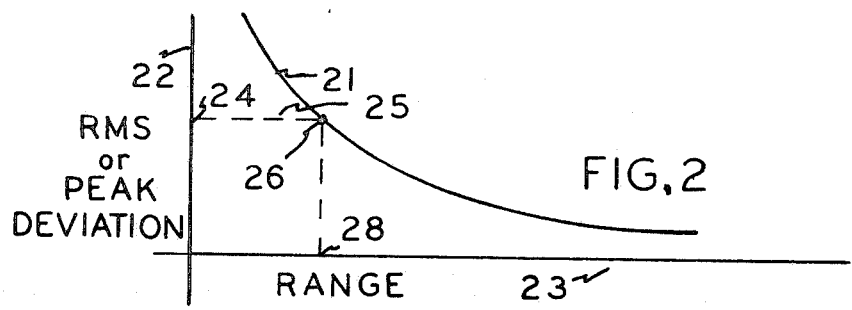
FIG. 2 is a graph showing inverse relationship between root mean square value or peak value and range.

If the directional signal of the receiver is taken over this 20 minute period and averaged out to obtain the root mean square value of the signal or the peak deviation of the signal it will be seen that the range or distance is inversely proportional to either value. This is shown in FIG. 2 by curve 21. Wherein the vertical axis 22 the scale is the magnitude of mean root square or peak deviation and the horizontal axis 23 scale is range to the transmitter. In a specific situation the vertical intercepts at 24 projected along the horizontal line 25 to the intersection 26 with line 21 and dropped to line 23 at point 28 will give the most probable range to the target.

Figure 3:
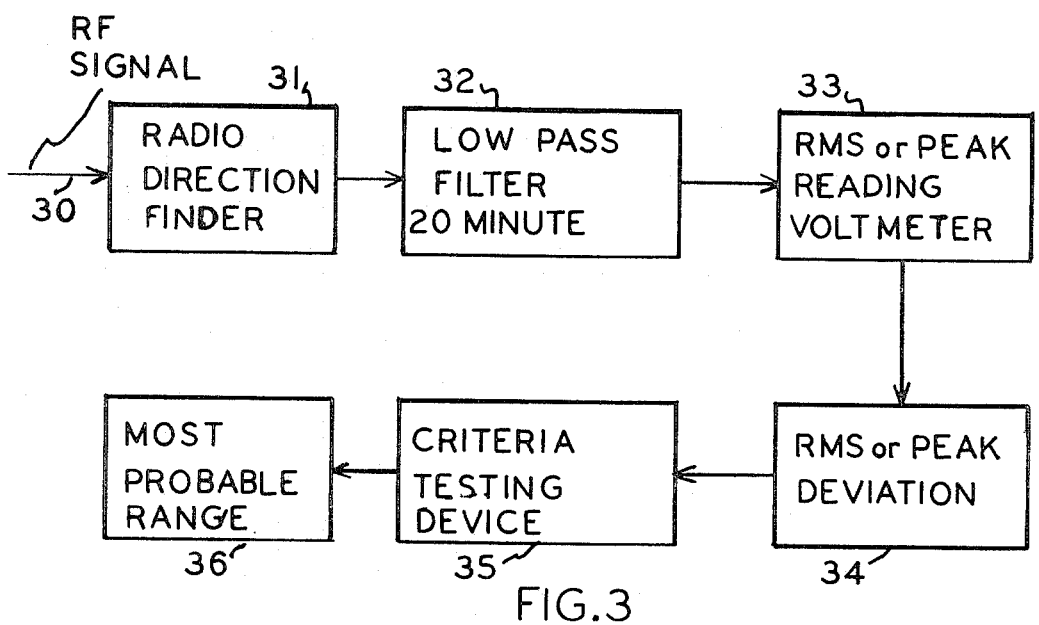
FIG. 3 shows in block diagram form the invention and equipment necessary to practice it.

FIG. 3 in block diagram form shows the invention as utilized. An incoming radio frequency signal 30 is received by existing radio direction finding equipment 31 which may be responsive to radio frequency signals in the 3 to 30 megahertz range, and is coupled to low pass filter 32. This filter has a 20 minute window which means for that period of received signals the filter is open and this is repeated.

This filter is a digital device whose output is coupled to the digital voltmeter 33 where the root mean square value or peak reading is obtained as shown by block 34. This reading is coupled to the criteria test device 35 which would be predetermined curves for this relationship as shown in FIG. 2 and most probable range is thereby determined as shown by block 36.

Obviously many modifications and variations of the present invention are possible in the light of the above teachings. It is therefore to be understood that within the scope of the appended claims the invention may be practiced otherwise than as specifically described.

I claim:

1. An improved passive type high frequency radio range finder comprising:

a. A low pass filter having a pass band capable of receiving radio signals in the 3 to 30 mega hertz range that fluctuate about a 20 minute period;

b. A root mean square or peak reading digital voltmeter coupled to said filter, to measure the strength 3 to to mega hertz signal over said period;
c. Means coupled to said voltmeter for determining the root mean square or peak deviation, and;
d. Means including a criteria testing device whereby a most probable range to a radio trasmitter estimate is obtained by comparing inversely either the root mean square or peak deviation to the range chart.

2. The improved passive type high frequency radio direction finder of claim 1 wherein the input to said filter is coupled to the radio frequency output of conventional radio direction finding equipment.

* * * * *